United States Patent
Smith et al.

[11] 3,715,009
[45] Feb. 6, 1973

[54] JET ENGINE NOISE SUPPRESSION SYSTEM

[75] Inventors: Cloyd D. Smith, Pacific Palisades; James H. Schmidt, Berkeley, both of Calif.

[73] Assignee: General Acoustics Corporation, Los Angeles, Calif.

[22] Filed: Aug. 17, 1970

[21] Appl. No.: 64,494

Related U.S. Application Data

[63] Continuation-in-part of Ser. No. 766,910, Oct. 11, 1968, Pat. No. 3,525,418.

[52] U.S. Cl. ............181/33 HC, 181/33 HD, 181/52
[51] Int. Cl. .......B64d 33/06, F01n 1/14, F01n 7//18
[58] Field of Search....181/33 HB, 33 HC, 33 HD, 33 K, 181/43, 51, 52, 33 HE

[56] References Cited

UNITED STATES PATENTS

| | | | |
|---|---|---|---|
| 2,685,936 | 8/1954 | Brenneman et al. | 181/33 HC |
| 2,798,743 | 7/1957 | Olesten | 181/33 HC |
| 2,810,449 | 10/1957 | Coleman | 181/33 HC |
| 2,940,537 | 6/1960 | Smith et al. | 181/33 HC |
| 3,174,581 | 3/1965 | Duthion et al. | 181/33 HB |
| 3,185,252 | 5/1965 | Lemmerman | 181/33 HC |
| 3,187,835 | 6/1965 | Smith | 181/33 HC |
| 3,208,552 | 9/1965 | Seifert | 181/33 HC |
| 3,458,008 | 7/1969 | Benham | 181/33 HC |

FOREIGN PATENTS OR APPLICATIONS

| | | | |
|---|---|---|---|
| 1,185,236 | 2/1959 | France | 181/33 HB |
| 1,187,245 | 3/1959 | France | 181/33 HC |
| 774,550 | 5/1957 | Great Britain | 181/33 HC |
| 847,482 | 9/1960 | Great Britain | 181/33 HC |
| 865,421 | 4/1961 | Great Britain | 181/33 HC |

*Primary Examiner*—Robert S. Ward, Jr.
*Attorney*—Forrest J. Lilly

[57] ABSTRACT

A noise suppression system for testing jet engines includes both an intake silencer and an exhaust noise suppressor. The latter is designed to remove energy from the exhaust gases by cooling them quickly and to this end provides an acoustical tubular shell with a removable liner which provides a water-cooled coil for absorbing thermal energy from the gases. The coil is part of a water circulation system which includes a cooling tower or other means through which the water is circulated to cool it, thereby permitting operation of the system over an extended period of time. At the anterior end of the shell is a housing having a sonically sealable opening which receives the tail pipe of the jet engine. This housing provides also a tortuous intake passageway for secondary air, which is fed to a concentric augmenter tube extending into the anterior end of the shell.

5 Claims, 18 Drawing Figures

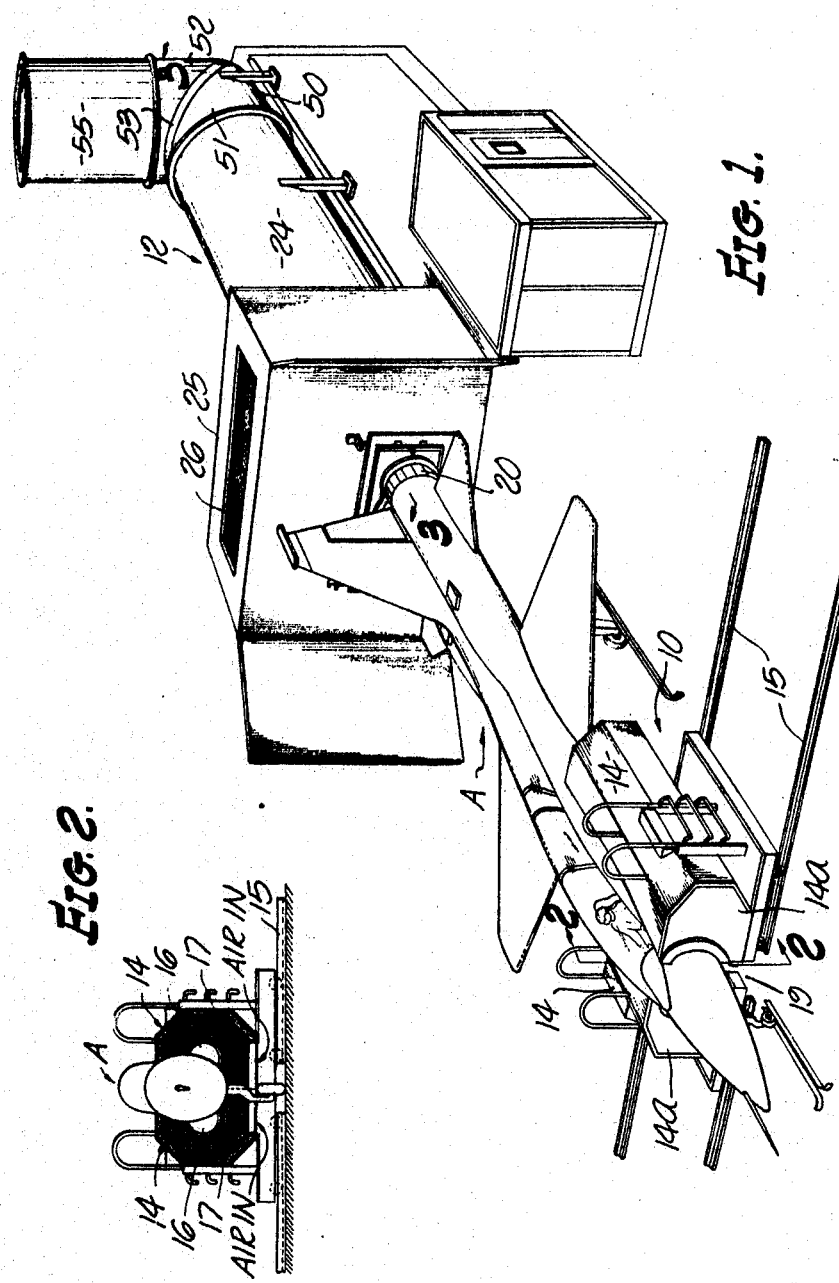

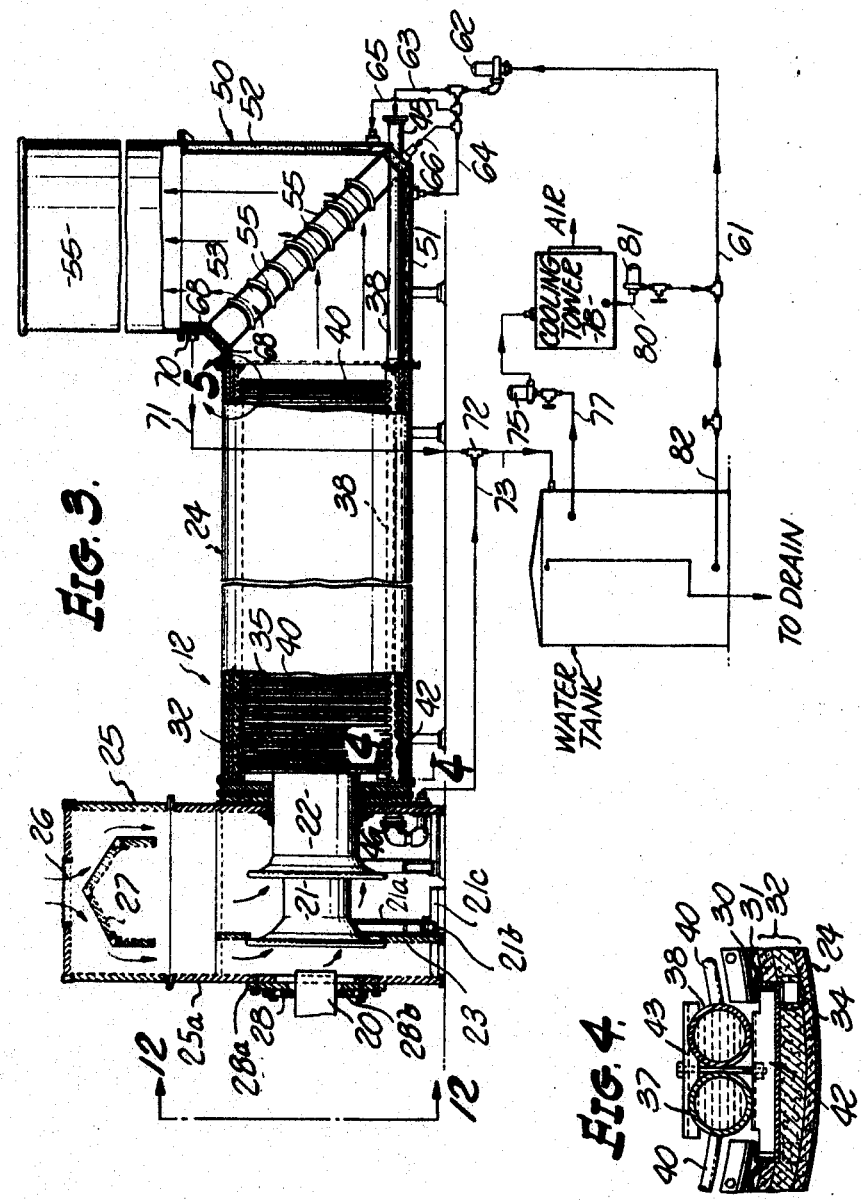

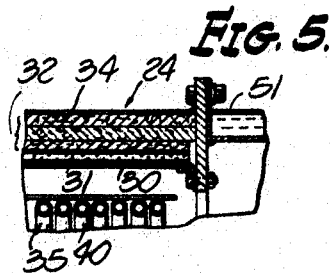
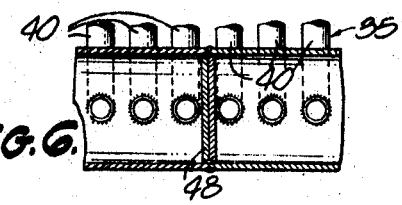
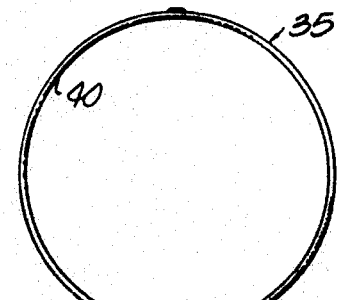
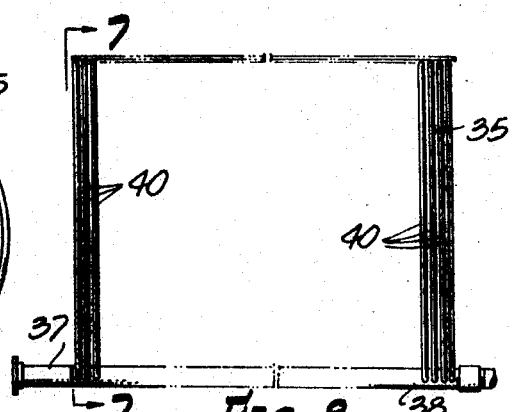
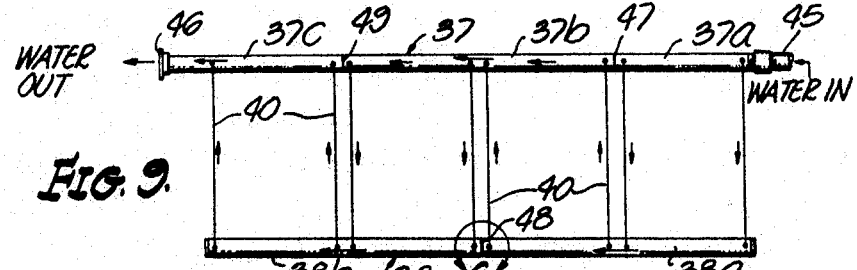
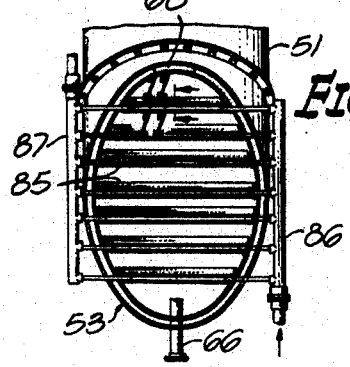
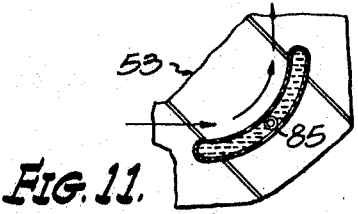

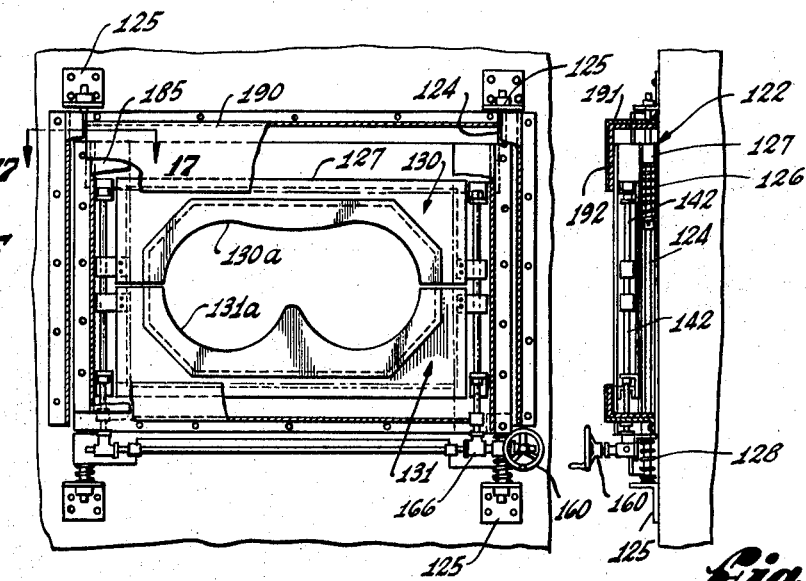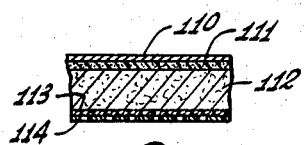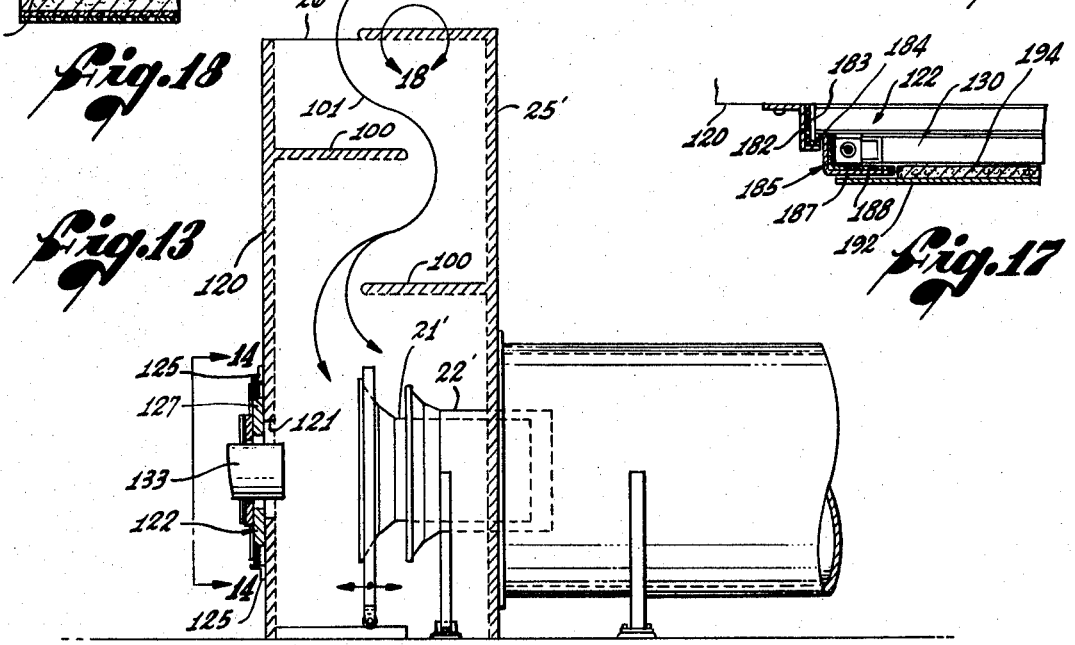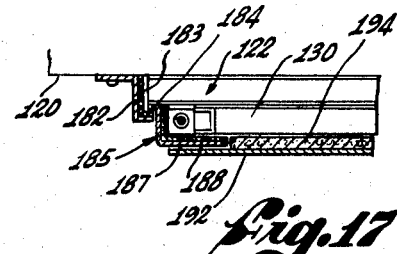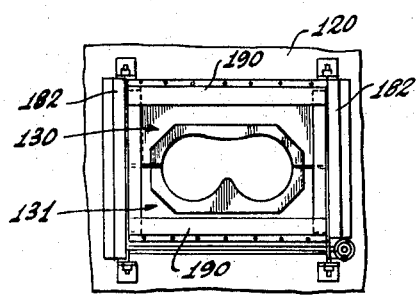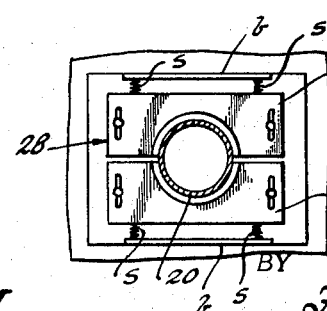
INVENTORS
CLOYD D. SMITH
JAMES H. SCHMIDT
BY Forrest J. Lilly
ATTORNEY

JET ENGINE NOISE SUPPRESSION SYSTEM

CROSS REFERENCE TO RELATED APPLICATION

This application is a continuation-in-part of our parent application entitled "Noise Suppression System," Ser. No. 766,910, filed Oct. 11, 1968, and now U.S. Pat. No. 3,525,418, issued Aug. 25, 1970.

BACKGROUND OF THE INVENTION

The present invention relates generally to means for absorbing quickly the sonic energy of a high velocity stream of gases to reduce the sound produced thereby, and is more particularly concerned with a structure designed to absorb and dissipate noise created during testing of jet engines in aircraft and the like.

The reactive propulsion engines, such as the gas turbine or the ram jet, produce a large amount of noise, both at intake and exhaust, as a result of the high velocities at which air or exhaust gases are moving. The frequency range of the noises produced by operating engines of this class includes not only the entire audible range but frequencies which are below and above the audible range. Because of the high intensity of the noise produced by these engines, these noises have definitely injurious physiological effects on nearby personnel; and this has led to the problem of protecting personnel operating in the immediate vicinity of an engine. Running engines during ground testing and other ground operations create serious occupational hazards for test personnel.

Reduction of the noise produced by an engine to a tolerable level can be accomplished by absorbing the sonic energy. Speaking generally, this can be accomplished by reducing as rapidly as possible the energy content of the exhaust stream and then discharging the exhaust gases into the atmosphere at a greatly reduced velocity as compared with the velocity at which they issue from the jet engine exhaust.

It is known that since energy can be extracted from the exhaust stream by cooling it prior to discharge into the atmosphere, this, an initial stage of cooling can be accomplished by adding atmospheric air to the exhaust stream. Additional cooling and energy absorption has been accomplished in known types of sound suppressing systems by spraying water directly into the stream of exhaust gases after the initial cooling by the introduction of secondary air. Maximum cooling is desired not only to extract sonic energy and thus reduce noise, but also to lengthen as much as possible the life of the acoustical shell. The use of water sprays is objectionable for various reasons mentioned in our above-identified parent application, which is directed to and claims a closed-water recirculation system using an internal cooling tower.

It is a general object of the present invention to devise novel and improved means for suppression of noise from the points of gas stream and secondary air intake into such a jet noise suppressor system. The present purpose is not, however, restricted to systems utilizing water cooling, through water cooling is preferred. The invention provides spring closure means, including sound sealing devices, at the head end of a jet engine noise suppressor for receiving and closely engaging the tail pipe of a jet engine, and for accommodating to change of elevation of the latter with increased jet discharge, and provides also novel secondary air entrance means acoustically contrived to suppress emission of noise from the points of secondary air intake.

BRIEF DESCRIPTION OF THE DRAWINGS

The invention will be more fully understood by reference to the following description and to the annexed drawings, in which:

FIG. 1 is a perspective of an improved noise suppression system embodying the present invention, illustrating its application to modern jet aircraft;

FIG. 2 is a vertical section through the intake silencer, as on line 2—2 of FIG. 1;

FIG. 3 is a combined vertical median section and elevation through the exhaust noise suppressor, with the water circulation system shown diagrammatically in connection therewith;

FIG. 4 is an enlarged vertical fragmentary section on line 4—4 of FIG. 3;

FIG. 5 is an enlarged detail in section of the area within the circle 5 of FIG. 3;

FIG. 6 is an enlarged detail in section of the construction of the manifold within the circled area 6 of FIG. 9;

FIG. 7 is a combined end elevation and section of the water-cooled coil taken on line 7—7 of FIG. 8;

FIG. 8 is a side elevation of the water cooling coil of the exhaust suppressor;

FIG. 9 is a flow diagram of the cooling coil of FIG. 8;

FIG. 10 is a section through the elbow illustrating a modified form of turning vanes;

FIG. 11 is a section on line 11—11 of FIG. 10;

FIG. 12 is a diagrammatic elevation as seen in the direction of the arrows 12—12 in FIG. 3;

FIG. 13 shows a modified silencer somewhat similar to that of FIG. 3, the front end enclosure or housing being shown in vertical medial longitudinal section, and a fragmentary portion of the tubular shell appearing in elevation;

FIG. 14 is a view taken in the direction of the arrows 14—14 of FIG. 15;

FIG. 15 is a view similar to FIG. 14, but enlarged, and with portions of the structure broken away to reveal underlying parts;

FIG. 16 is a view looking towards the left in FIG. 15, with certain parts broken away;

FIG. 17 is a view taken as indicated by line 17—17; and

FIG. 18 is an enlarged sectional view within the area 18 of FIG. 13.

DESCRIPTION OF A PREFERRED EMBODIMENT

Referring now to the drawings, and more particularly to FIG. 1, there is shown therein a jet aircraft A which has been brought into a position such that the noise suppressor system can be applied to it. Generally speaking, the system comprises two main units: an inlet silencer indicated generally at 10 and the exhaust noise suppressor indicated generally at 12.

The inlet silencer consists of a pair of side shields 14 mounted upon tracks 15 which enable the shields to be brought into contact with the aircraft at opposite sides thereof. The front and sidewalls of the shields are of acoustic construction and are designated to absorb the sound generated at the inlet end of the air ducts 16 leading to the engines of the aircraft. Any of various well-known wall constructions may be used for this purpose.

The main air inlet in the silencer 10 for the engines is at the bottom of the two shields 14. As may be seen in FIG. 2, the rear end of each shield is provided with a screened opening 17 designed to permit a large volume of air to enter the space enclosed by shields 14 but to remove any harmful particles of foreign matter. The shields are also open underneath the fuselage of the aircraft and screening at 18 is across this air inlet opening. A minor air inlet is also preferably provided at the forward end of the two shields, as may be seen in FIG. 1, by leaving a space 19 between the two shields underneath the nose of the aircraft. The side and front walls of the shields 14 are of acoustic construction so that the open ends of air ducts 16 are substantially enclosed, except as necessary to admit air for the engines.

The front walls 14a of the shields 14 are in effect targets against which sound generated at air intakes 16 impinges. By making these walls of acoustic construction, much of the intake-generated sound, especially objectionable high frequencies, is absorbed. When one engine is running, the opposite intake unit acts as an additional acoustical absorptive chamber.

The exhaust noise suppressor indicated generally at 12 receives the high velocity stream of exhaust gases from the jet engine or engines in the tail of the aircraft. The tailpipe or exhaust duct of the aircraft is indicated at 20 in FIG. 3 which shows the exhaust noise suppressor in detail.

The stream of hot exhaust gases leaving tailpipe 20 enters augmenter tube 21 which is axially aligned with tailpipe 20. The tailpipe is smaller in diameter and may be spaced slightly from the entrance to tube 21 so that surrounding secondary air is drawn into the inlet end of tube 21 by injector action from the exhaust stream.

It is preferable to add to tube 21 a second augmenter tube 22 of larger diameter than tube 21 that provides a second inlet for surrounding air, also by injector action. Thus, there is a mixture of the exhaust gases and secondary air passing through the augmenter assembly comprising tubes 21 and 22. The secondary air cools the high temperature exhaust gases and the mixture is discharged from the end of tube 22 into tubular shell 24 which is a means for obtaining further cooling of the gas stream.

The inlet end of the augmenter assembly is located within enclosure 25 which traps and absorbs sound energy of the exhaust stream which escapes at the inlet of the augmenter assembly. Enclosure 25 has an upwardly facing air inlet 26 for secondary air, the air passing down around an internal baffle 27 which traps sound in this region by providing tortuous paths for the incoming air downwardly within the enclosure 25 to the inlet ends of the two tubes 21 and 22. The augmenter tubes 21 and 22 have bell mouths and a partition 23 may be used to divide the secondary air flow into a portion entering augmenter 21 and another portion entering augmenter 22. Optimum cooling can be obtained by longitudinally adjusting the augmenter tube 21 to control the proportion of air entering the two tubes. The augmenter tube 21 can for this purpose be placed on a mounting structure 21a having roller means 21b movable along a track 21c. In such case, of course, the partition 23 must be arranged to accommodate such movement; it can, however, and generally is, simply omitted, as in FIG. 13. Alternatively, the augmenter tube 21 can be adjusted longitudinally on its rollers, and a partition such as 23 installed afterwards.

The escape of sound at the point of entry of tailpipe into enclosure 25 is reduced by seal 28. Seal 28 is divided horizontally into two halves 28a and 28b which can be moved toward each other and into engagement with tailpipe 20 of the aircraft, the edges of the seal being softly padded to conform to the surface of the tailpipe and also to avoid injury thereto. The two halves 28a and 28b of seal 28 are slidably mounted externally on the front wall 25a of enclosure 25. They are also spring loaded to allow for vertical movement of the tailpipe during various power settings. A simple diagrammatic showing of such spring loading appears in FIG. 12, where springs s on brackets b engage the upper and lower halves of the seal, and can yield and elongate, respectively, as the case may be, as the tailpipe tends to rise or fall. A more detailed disclosure, together with preferred means for moving the halves of the seal toward and from one another, and the addition of a sound trap, are shown in the modification of FIGS. 13 – 18. The structures of these FIGS. may of course be incorporated in the silencers of FIGS. 1 and 3.

From augmenter tube 22, the exhaust gases, now partially cooled, enter the cooling chamber within shell 24. Shell 24 is preferably circular in cross section and has an annular wall of acoustical material which provides a high degree of energy and noise absorption. While the wall may have any desired construction and thickness, the preferred construction is illustrated in FIGS. 4 and 5. In these figures, it will be seen that the innermost element of the wall is a perforated sheet 30. Outwardly of this sheet is a corrugated sheet 31 which is also perforated metal. Outwardly of corrugated sheet 31 is a zone 32 which is filled with fibrous high temperature sound absorbent material, such as glass fibers, or rock wool. The zone 32 is preferably composed of a plurality of layers of fibrous material of outwardly increasing density in order to render the wall most effective over a wide range of sound frequencies. On the outside, the wall is covered with a solid metal plate 34. All of the materials for the wall of shell 24 are selected to withstand the elevated temperatures encountered.

Inside shell 24 is a gas cooling coil, indicated generally at 35, which serves as a liner for shell 24 and defines the main passage for exhaust gases through the cooling chamber within the coil. The cooling coil is shown in detail in FIGS. 7 and 8, while water circulation and the connections between the various elements of the coil are shown diagrammatically in FIG. 9.

The gas cooling means, identified generally at 35, and referred to herein as the cooling coil, comprises a longitudinally extending foundation means which, for reasons that will become apparent, is designed to operate in the manner of a skid, and upon which a plurality of individual annual pipes or turns of the cooling coil are supported. Actually, it is preferred to take advantage of the presence of the structural members at the bottom of the cooling coil forming the base elements to utilize these members as manifold means to distribute the cooling water to the several individual coils. These considerations lead to the preferred design, although it will be understood that the invention is not necessarily limited to all of the details of this preferred embodiment of the coil.

As shown in FIGS. 7 and 8, at the bottom of the cooling coil 35, there is a pair of longitudinally extending pipes 37 and 38. Although these pipes are in effect segmented in order to function as manifold means as will be described, the successive segments in each pipe are axially aligned and connected together to form a structurally unitary member in order that the two pipes 37 and 38 provide the foundation or base on which the coil as a whole is supported. Connected to the two pipes 37 and 38 are a plurality of small annular tubes or hoop-like pipes 40, the diameter of these turns being such that coil assembly 35 is received within shell 4 with some clearance between the pipes 40 of coil 35 and inner wall 30 of the shell, except at the bottom of the shell where longitudinal members 37 and 38 contact the shell.

The individual pipes 40 or turns of the cooling coil are preferably spaced from each other and also from the inside surface of the wall of shell 24, as shown in FIG. 5. This permits more complete exposure of the exterior surface of tubes 40 to the heated gases passing through the cooling chamber, thereby increasing the rate of heat exchange between the gases and the pipes 40. Also, the spacing of the pipes from the shell walls cools the gases that reach the shell wall and thus reduces the maximum gas temperatures to which the shell is exposed. This temperature reduction, as compared to a shell with water sprays and no coil 35, results in a greatly extended life of the equipment. Based on observations to date, it appears that the useful life of a suppressor shell may be increased by a factor of as much as five. It has also been found that the spacing of the cooling tubes, in combination with the absorptive liner, results in a modified resonating chamber — resulting in an increase in low frequency attenuation.

Incorporated in the wall of shell 24 are a plurality of support pads 42, as shown in FIG. 4. These are located at the bottom of the shell and are spaced at suitable intervals longitudinally of the shell to support coil 35 with the two pipes 37 and 38 resting upon pads 42. In position within this shell, the coil assembly is held in place by clamps 43 which can be tightened down against pipes 37 and 38.

However, when clamps 43 are loosened and the inlet and outlet water connections to the coil are disconnected, coil 35 as a whole can slide into and out of shell 24; and it is to facilitate this movement of the coil as a whole that the two pipes 37 and 38 are made of structurally continuous members. Alternatively, pads 42 can be replaced by a single continuous support extending lengthwise of the shell.

In order to obtain manufacturing economies of production and for obvious engineering reasons, cooling coil 35 is made of the same diameter throughout its length, as is also tubular shell 24. However, it will be understood that the invention is not necessarily limited to this design.

Water flow within coil 35 is shown schematically in FIG. 9. Supply line 45 is connected to one end of pipe 37 while outlet 46 is at the opposite end of the same manifold pipe. Rapid contours transfer from the gases to the water within the tubes 40 requires a large surface area in contact with the gases. This can be obtained by a large number of tubes 40 of relatively small diameter, as opposed to smaller number of tubes of larger diameter. At the same time, reduction in the diameter of the tubes increases the resistance to water flow and reduces the quantity of water flowing through a tube past a given point per unit time. For this reason, the coil is not made up of a single length of tubing arranged helically but instead the individual pipes 40 each extend for a single turn and extend between one manifold section in pipe 37 and another manifold section in pipe 38; and the individual pipes 40 are arranged in a number of groups in parallel with water flow in one direction within each group.

Assuming for purposes of illustration that there are four groups of pipes 40, each occupying approximately one fourth of the length of coil 35, water enters pipe 37, through supply line 45. At approximately the quarter point of the coil, barrier 47 closes manifold pipe 37 so that flow from right to left in pipe 37 is limited to initial manifold section 37a. All of the annular pipes 40 are connected to manifold 37a are thus supplied water which flows through them to the initial manifold section 38a of the opposite manifold pipe 38. Water then flows to the left within manifold section 38a to the second group of pipes 40, flow being limited in pipe 38 by barrier 48. As a result, in the second group of pipes 40, flow is from manifold 38 back to manifold 37. Flow entering the second manifold segment 37b now flows within that segment to a point where flow is limited by a further barrier 49 and water flows through the third group of pipes 40 from manifold 37 back to the second segment 38b of manifold 38. Continuing this zig-zag pattern of flow between manifolds, water leaves the second manifold section 38b to return to the final segment 37c of manifold 37 and then out of the coil at outlet 46.

When pipes 40 are divided into an even number of groups, here there are four, the water outlet line will be connected to the same manifold as the supply. Were the pipes 40 arranged in three groups, then water discharge line 46 would be connected to the end of manifold segment 38b. From inspection of FIG. 9, it will be seen that some of the pipe segments are longer than others, and each segment may be regarded by itself as a manifold. The first and last segments through which the water flows are connected to only one group of pipes 40 and are consequently shorter than the intervening segments of the manifold which are each connected to two groups of pipes 40.

From the standpoint of water flow and distribution, each of the segments of the individual manifolds 37 and 38 is a separate manifold as far as the flow pattern is concerned, distributing water to and/or receiving water from a group of pipes, there being preferably an equal number of pipes 40 in each group. However, pipes 37 and 38 are each referred to as a manifold since they have structural integrity which permits them to operate as support members for the coil as a whole, as described above.

Thus, it will be seen that viewed from one standpoint each of manifolds 37 and 39 may be regarded as a continuous pipe with plugs at intervals to localize water flow within the pipes. From another viewpoint, each segment of these two members may be viewed as a complete manifold unit adjacent another similar unit. This arises from the dual functions of the pipes 37 and 38, as explained.

At the end of shell 24 opposite augmenter tubes 21 and 22, the now considerably cooled gases are discharged. The gases are still hot enough that discharge in a horizontal direction is undesirable; and, consequently, it is preferred to connect the end of the shell to an elbow structure 50 illustrated in FIG. 3 as comprising three principle sections. The elbow includes two sections 51 and 52, each of which has an end face with a connecting flange lying in a radial plane normal to the section axis and at the opposite end a face lying in a plane at 45° to the section axis. These latter two faces are each connected to intermediate section 53 which is elliptical in outline and which carries internally a plurality of gas turning vanes 55. The three sections of the elbow are conveniently welded together to form a unitary structure, and the elbow is connected to shell 24 in such a position that gases discharged are directed upwardly into the atmosphere.

If desired, the gas discharge from elbow section 52 can be carried further upwardly into the air by a stack 55 on the discharge end of the elbow.

Additional cooling of the gas can be effected and the walls of the elbow can be protected against excessive heat by providing cooling in the form of a water jacket for each of sections 51, 52, and 53 of the elbow, as shown particularly in FIG. 3. In each section, the jacket is formed by providing a double wall for the elbow with space between the two walls to receive water which circulates within the space.

To permit operation of the exhaust noise suppressor over an extended period of time, means are provided for cooling and circulating water through coil 35 and the elbow sections. The circulation system is illustrated diagrammatically in FIG. 3. This circulation system consists of a reservoir or surge tank 60 from which water may be taken through lines 61 and pumped through coil 35 and the jacket on the elbow structure by main circulation pump 62. The discharge side of pump 62 is connected by line 63 directly to supply line 45 to cooling coil 35. Branch lines 64 and 65 each supply water to one of the water jackets of elbow sections 51 and 52, respectively, the connections to the water jackets being at a low point on the jackets and remote from the outlet, to be mentioned. Another branch supply line 66 supplies water to the jacket of intermediate elbow section 53.

The three separate water jackets on the three elbow sections 51, 52, and 53 are placed in communication with each other near outlet 70 by a pair of openings 68 in the interconnecting flanges. As a consequence, the single discharge line 71 connected to outlet 70 receives heated water from all three jacket sections. Line 71 is connected at 72 to discharge line 73 which is connected to outlet 46 from coil 35. Line 73 returns the heated water from the noise suppressor to reservoir 60.

In order to cool the water after return to tank 60, it is withdrawn form the tank by pump 75 through line 77 which delivers the discharge from pump 75 to cooling tower 78. From the sump at the bottom of the cooling tower, cooled water is withdrawn through line 80 by pump 81; and the discharge side of pump 81 is connected to line 61 so that the water cooled in the tower can flow directly to the intake side of main circulating pump 62 without necessarily returning to the storage tank, although the storage tank is, in effect, continuously connected to the circulating pump in order that there is always an adequate supply of water available to pump 62. A valved by-pass line 82 may be used to return cooled water to tank 60 if circulation through the suppressor is not needed.

FIGS. 10 and 11 illustrate a variational embodiment of the invention in which additional cooling of the exhaust gas stream is achieved by water cooling of the turning vanes in the elbow. The outer wall of elbow section 53 is water-jacketed as described. Turning vanes 85 are hollow to permit cooling water to pass through them. The vanes extend outwardly through the water-jacketed wall to connect to an inlet manifold 86 and an outlet manifold 87. In turn, these two manifolds are connected to the closed circuit for circulation of cooling water.

FIGS. 13 – 18 show a jet engine sound suppressor of the type of the embodiment described above, showing much of the structure of the earlier embodiment, together with certain improvements. Corresponding parts of the two embodiments will be designated by the same reference numerals, but with primes added in the case of FIGS. 13 – 18.

The housing 25' of the embodiment of FIGS. 13 – 18 is of somewhat increased height. It has an air inlet 26' at the top, located over the front portion of the housing, and extending from the front edge of the housing for somewhat less than half the distance from its front to its rear edge. Below opening 26', the housing contains acoustic air baffles 100, projecting alternately from the front and rearward housing walls. The projecting end portions of the baffles overlap one another, as shown, providing a tortuous path for the incoming airstream 101, and thus affording a sound trap against emission of noise. The walls of housing 25', including the baffles 100, are of acoustic construction, and thus tend to absorb rather than reflect sound impinging thereon. A typical construction is shown in the cross-section of FIG. 18. An outside sheet 110 of sheet steel, say 11 gauge is bonded to a sheet 111 of hard board, such as one inch thick gypsum board. Next to sheet 111 is a layer 112 of mineral wool, against which is a flexible sheet 113 of glass fiber. Adjacent the later is a perforated sheet 114 of 11 gauge sheet steel. Such an acoustic board has very high sound absorption characteristics.

Augmenter tubes 21' and 22' are provided, in general as in FIG. 3. The augmenter tube 21' is on a support 21b having roller means 21c movable longitudinally of the tube on a platform 21d. Thus, movement of the tube 21' adjusts the proportion of secondary air into the two augmenter tubes, an enables the optimum position to be found, at which cooling and noise reduction are at a maximum.

In the front wall 120 of air inlet housing or conduit 25' is a window 121, over and in front of which is mounted a rectangular frame 122. This frame is vertically slidable on stationary vertical rods 124 passing through its opposite vertical edge portions and secured to front housing wall 120 by brackets such as 125. An upper spring 126 encircles the upper horizontal frame member 127 on the underside, and engaging a collar 128 on the rod 124 at its lower end. Thus, the spring yieldingly supports the frame 122 by engaging under the frame member 127. A lower spring 128 encircles the rods 124 below the frame 122, and engages the lower brackets 125 at the lower ends of the springs. These spring thus also yieldingly support the frame 122. The frame 122 floats on the springs 126 and 128.

A pair of upper and lower seals or seal boards 130 and 131 are mounted for vertical movement toward and from one another on the rectangular frame 127 and are formed on their contiguous edges with then 130a and 131a, preferably added, to conform to close on the effect a seal to the tail pipe or pipes 133. These seals are mounted for movement toward and from one another to close, or separate from, the tail pipe or pipes 133. In the present preferred arrangement, the frame 122 is spring-supported, and the seals are movable on the frame 122 to close snugly on the tail pipe. Thus, as the tail pipe tends to rise, the seal boards will elevate, taking some of the loading off the springs. If the tail pipe then tends to lower, under decreased power, more of its weight is reimposed on the frame 122, through the seals 130 and 131, and the frame 122 lowers accordingly.

The presently illustrated means for moving the seals 130 and 131 relatively to the frame 127 embodies threaded vertically aligned nuts or lugs 140 on the seals, in which are received oppositely pitched halves of lead screws 142. The latter may be rotated simultaneously, in the same direction, by any suitable means, e.g., a hand wheel 160 operating through an angle gear drive 161 mounted on the frame 122 and driving a jack shaft 164 driving the two lead screws through angle drives 166.

Thus the two seals may be closed on the tail pipe or pipes by operation of the hand wheel 160; and it will be seen that the springs 126 and 128 spring-load the seals to move vertically to accommodate vertical movement of the tail pipe or pipes at various power settings of the jet engines exhausting through the tail pipes.

Unique noise shields are also preferably provided to seal against escape of noise about the seals 130 and 131 and the supporting structure therefor. These are shown in FIGS. 14, 15, 16, and 17 but omitted for clarity in FIG. 13. Two vertical sheet steel members 180 of substantially Z shaped cross section are mounted on the front wall 120 of housing 25', and have flanges 181 overhanging vertical edge portions of frame 122 (FIG. 17). These members are lined with sound absorbing material 183. Inside and interengaging with, as well as slidable along, the flanges 182, are the flanges 184 of substantially Z-shaped members 185, also acoustically treated with sound absorbent material in areas exposed to jet noise. The flanges 184 of these members 185 engage and are secured to the sides of the frame 122, and the members 185 stand outwardly therefrom and, with their inwardly turned flanges 187, define a channel, lined with acoustic material 188, in which the seals 130 and 131 may vertically slide. In addition, two upper and lower horizontally disposed shields 190 are secured to wall 120, and form upper and lower end pockets which receive portions of the frame 122, the seals 130 and 131, and the flange portions 187 of members 185. These shields 190 have horizontal webs 191, and flange portions 192 turned a right angles therefrom, so as to relatively closely receive the shield flanges 187. Between the flanges 187, the inside surfaces of portions 192 are treated with acoustic absorbent material as at 194. These provisions are effective in reducing noise otherwise emanating from the structure which surrounds and closes on the tail pipes.

From the foregoing description, it will be realized that various changes in the detailed construction and arrangement of the noise suppressor system may occur to persons skilled in the art without departing from the spirit and scope of the present invention. Accordingly, the foregoing description is considered as being illustrative of, rather than limitative upon, the invention disclosed herein.

We claim:

1. In a jet engine noise suppressor for receiving and reducing the noise of exhaust gases discharged from the tail pipe of the engine, a tubular noise suppressor shell for conducting the exhaust gases discharged from said tail pipe, a housing structure at the anterior end of said shell including an apertured front wall and seal means movable thereon and supported therefrom for receiving and closing about said tail pipe and forming a seal with said tail pipe, said housing structure confining the exhaust gases on their way from said tail pipe to said anterior end of said shell, said seal means comprising a pair of seal members arranged to move relative to said front wall and to close on said tail pipe by relative movement toward one another, and spring loading means for yieldingly supporting said seal members with accommodation for vertical movement of the tail pipe at different power settings of the jet engine.

2. The subject matter of claim 1, wherein said seal members are movable vertically to close on the tail pipe, and said spring loading means act vertically on said seal members.

3. In a jet engine noise suppressor for receiving and reducing the noise of exhaust gases discharged from the tail pipe of the engine, a tubular noise suppressor shell for conducting the exhaust gases discharged from said tail pipe, a housing structure at the anterior end of said shell including an apertured front wall and movable seal means thereon and supported therefrom for receiving and closing about said tail pipe and forming a seal with said tail pipe, said housing structure confining the exhaust gases on their way from said tail pipe to said anterior end of said shell, means forming a secondary air entrance passage open at one end to the atmosphere and discharging at the other in a region to become added to the hot exhaust gases passing from said tail pipe to said anterior end of said shell, and concentric annularly spaced augmenter tubes located in the anterior end of said shell for receiving and passing the hot exhaust gases from said tail pipe into said anterior end of said shell in two divided columns and for receiving said secondary air from said passage to mix with the two columns of said gas, one of said augmenter tubes being adjustable longitudinally relative to the other.

4. In a jet engine noise suppressor for receiving and reducing the nose of exhaust gases discharged from the tail pipe of the engine, a tubular noise suppressor shell for conducting exhaust gases discharged from said tail pipe, an augmenter tube extending axially into the anterior end portion of said shell for receiving and passing hot exhaust gases from said tail pipe inside thereof, the anterior end portion of said tube and shell being annularly spaced from one another to form an annular secondary air intake port which opens into said gas passageway, and means supporting said augmenter tube for axial movement longitudinally of said shell.

5. The subject mater of claim 2, including also:

a vertically movable frame supported on said front wall or vertical movement relative thereto, said frame having vertical edge portions, said spring loading means reacting from said front wall to yieldingly support said frame, said pair of seal members being supported from said vertically movable frame and being movable toward and form one another relative to said frame to close on said tail pipe, a pair of vertical sound shield strips mounted on said front wall alongside said vertical edge portions of said movable frame, said strips having vertical flanges turned toward one another, a pair of vertical sound seal strips mounted on said vertically movable frame, adjacent to said vertical edge portions thereof, said last mentioned strips having portions vertically slidingly engaging and acoustically sealed to said first mentioned strips, and having flange portions forming edge channels slidably receiving vertical edge portions of said seal members and being acoustically sealed thereto, and a pair of horizontal sound shield strips mounted on said front wall, above and below said vertically movable frame, including web and flange formation extending over and downwardly, and over and upwardly, respectively, relative to the respective upper and lower portions of said movable frame and of said seal members.

* * * * *